(12) United States Patent
Nakayama

(10) Patent No.: US 10,957,494 B2
(45) Date of Patent: Mar. 23, 2021

(54) SOLID ELECTROLYTIC CAPACITOR

(71) Applicant: Panasonic Intellectual Property Management Co., Ltd., Osaka (JP)

(72) Inventor: Takuya Nakayama, Osaka-fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 16/472,683

(22) PCT Filed: Jan. 19, 2018

(86) PCT No.: PCT/JP2018/001643
§ 371 (c)(1),
(2) Date: Jun. 21, 2019

(87) PCT Pub. No.: WO2018/142972
PCT Pub. Date: Aug. 9, 2018

(65) Prior Publication Data
US 2019/0362903 A1  Nov. 28, 2019

(30) Foreign Application Priority Data

Jan. 31, 2017 (JP) .............................. JP2017-015466
Jan. 31, 2017 (JP) .............................. JP2017-015793

(51) Int. Cl.
*H01G 9/15* (2006.01)
*H01G 9/025* (2006.01)
(Continued)

(52) U.S. Cl.
CPC ............. *H01G 9/15* (2013.01); *H01G 9/025* (2013.01); *H01G 9/04* (2013.01); *H01G 9/07* (2013.01)

(58) Field of Classification Search
None
See application file for complete search history.

(56) References Cited

U.S. PATENT DOCUMENTS

2004/0160729 A1\* 8/2004 Kochi ...................... H01G 9/15
                                                                361/528
2005/0047060 A1   3/2005 Arai et al.
(Continued)

FOREIGN PATENT DOCUMENTS

JP    S63-211615 A    9/1988
JP    2004-165265 A   6/2004
(Continued)

OTHER PUBLICATIONS

International Search Report (ISR) dated Apr. 17, 2018 in International (PCT) Application No. PCT/JP2018/001643.

*Primary Examiner* — Dion Ferguson
(74) *Attorney, Agent, or Firm* — McDermott Will and Emery LLP

(57) ABSTRACT

A solid electrolytic capacitor including: a capacitor element including an anode part provided on a first end side, and a cathode part provided on a second end side opposite the first end, so as to be adjacent to the anode part; and a cathode lead connected to the cathode part. The capacitor element has, on a surface of the cathode part, either one or both of a first protective layer and a second protective layer, the first protective layer being electrically insulating and provided on the first end side, the second protective layer being electrically insulating and provided on the second end side. The cathode part and the cathode lead are connected to each other via an electrically conductive adhesive layer.

18 Claims, 5 Drawing Sheets

(51) Int. Cl.
*H01G 9/04* (2006.01)
*H01G 9/07* (2006.01)

(56) References Cited

U.S. PATENT DOCUMENTS

| | | | | |
|---|---|---|---|---|
| 2006/0133014 | A1* | 6/2006 | Yano | H01G 9/0032 |
| | | | | 361/524 |
| 2008/0232039 | A1* | 9/2008 | Saito | H01G 9/15 |
| | | | | 361/534 |
| 2009/0128995 | A1* | 5/2009 | Nemoto | H01G 9/15 |
| | | | | 361/523 |
| 2009/0135550 | A1 | 5/2009 | Umemoto et al. | |
| 2009/0161299 | A1* | 6/2009 | Nemoto | H01G 2/065 |
| | | | | 361/532 |
| 2009/0201631 | A1* | 8/2009 | Kasuga | H01G 9/08 |
| | | | | 361/535 |
| 2010/0165547 | A1* | 7/2010 | Kuranuki | H01G 9/15 |
| | | | | 361/525 |
| 2010/0265634 | A1* | 10/2010 | Freeman | H01G 11/56 |
| | | | | 361/529 |
| 2011/0090621 | A1* | 4/2011 | Chacko | H01G 9/0425 |
| | | | | 361/523 |
| 2011/0149477 | A1* | 6/2011 | Summey | H01G 9/012 |
| | | | | 361/528 |
| 2011/0157776 | A1 | 6/2011 | Ishida et al. | |
| 2013/0271894 | A1* | 10/2013 | Biler | H01G 9/052 |
| | | | | 361/528 |
| 2016/0118194 | A1* | 4/2016 | Chen | H01G 9/15 |
| | | | | 361/532 |
| 2019/0006109 | A1* | 1/2019 | Shimamoto | H01G 9/08 |

FOREIGN PATENT DOCUMENTS

| | | |
|---|---|---|
| JP | 2005-079463 A | 3/2005 |
| JP | 2007-194310 A | 8/2007 |
| JP | 2009-129936 A | 6/2009 |
| JP | 2009-130166 A | 6/2009 |
| JP | 2011-155236 A | 8/2011 |

* cited by examiner

SOLID ELECTROLYTIC CAPACITOR

CROSS-REFERENCE OF RELATED APPLICATIONS

This application is the U.S. National Phase under 35 U.S.C. § 371 of International Patent Application No. PCT/JP2018/001643, filed on Jan. 19, 2018, which in turn claims the benefit of Japanese Application No. 2017-015466 and Japanese Application No. 2017-015793, both filed on Jan. 31, 2017, the entire disclosures of which Applications are incorporated by reference herein.

TECHNICAL FIELD

The present invention relates to a solid electrolytic capacitor including a capacitor element having an anode part provided on a first end side and a cathode part provided on a second end side opposite the first end.

BACKGROUND ART

Solid electrolytic capacitors, which have low equivalent series resistance (ESR) and excellent frequency characteristics, are used in various electronic devices. A solid electrolytic capacitor includes at least one capacitor element. The capacitor element comprises an anode part and a cathode part. To the cathode part, a cathode lead is connected via electrically conductive adhesive. When stacking two or more capacitor elements together, the cathode parts are connected to each other via electrically conductive adhesive.

Patent Literature 1 teaches providing an electrically insulating resin layer at the boundary between the anode part and the cathode part, in view of preventing an increase in leak current due to heat when reflowing. Patent Literature 2 teaches covering the capacitor element with an electrically insulating bather layer that inhibits permeation of moisture and oxygen.

CITATION LIST

Patent Literature

[PTL 1] Japanese Laid-Open Patent Publication No. 2011-155236
[PTL 2] Japanese Laid-Open Patent Publication No. 2007-194310

SUMMARY OF INVENTION

Technical Problem

The insulating resin layer of Patent Literature 1 covers merely a small area of the cathode part in order to reduce the leak current, and it does not have a function of blocking the entry of moisture and oxygen. In Patent Literature 2, in which the barrier layer formed on a film substrate is transferred onto the capacitor element, the smaller the size of the solid electrolytic capacitor is, the more difficult it is to cover the cathode part, without excess or deficiency. Especially when the solid electrolytic capacitor includes a stack of capacitor elements, the barrier layer can cover only the outermost surface of the stack, failing to suppress the deterioration of the solid electrolytic capacitor.

Solution to Problem

One aspect of the present invention relates to a solid electrolytic capacitor including: a capacitor element including an anode part provided on a first end side, and a cathode part provided on a second end side opposite the first end, so as to be adjacent to the anode part; and a cathode lead connected to the cathode part. The capacitor element has, on a surface of the cathode part, either one or both of a first protective layer and a second protective layer, the first protective layer being electrically insulating and provided on the first end side, the second protective layer being electrically insulating and provided on the second end side. The cathode part and the cathode lead are connected to each other via an electrically conductive adhesive layer.

Another aspect of the present invention relates to a solid electrolytic capacitor including an element stack of capacitor elements. The capacitor elements each include an anode part provided on a first end side, and a cathode part provide on a second end side opposite the first end, so as to be adjacent to the anode part. The capacitor elements each have, on a surface of the cathode part, either one or both of a first protective layer and a second protective layer, the first protective layer being electrically insulating and provided on the first end side, the second protective layer being electrically insulating and provided on the second end side. The cathode parts of the capacitor elements are connected to each other via an electrically conductive adhesive layer.

Advantageous Effects of Invention

According to the present invention, a solid electrolytic capacitor with less deterioration can be provided.

DESCRIPTION OF EMBODIMENTS

First Embodiment

Figure 1:
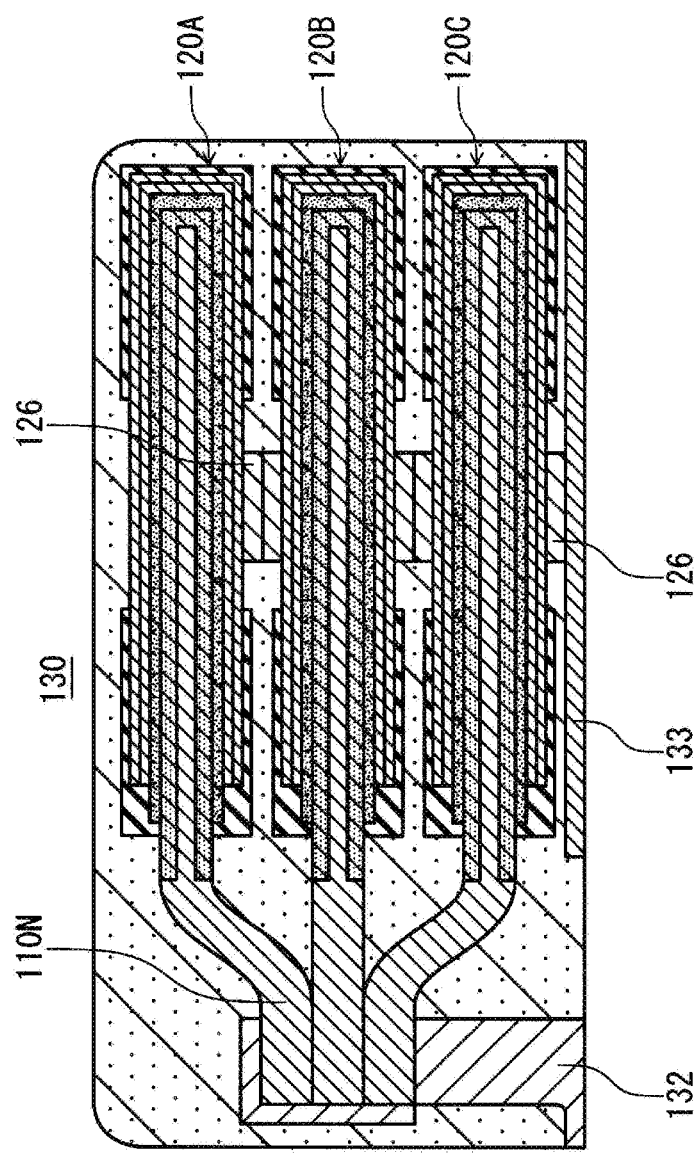
FIG. 1 A vertical cross-sectional view of an example of a solid electrolytic capacitor including a stack of capacitor elements according to a first embodiment.

A solid electrolytic capacitor according to the present embodiment includes one or more capacitor elements. The capacitor element has an anode part provided on a first end side, and a cathode part provided on a second end side opposite the first end, so as to be adjacent to the anode part. The surface of the cathode part is provided, on the first end side, with a first protective layer that is electrically insulating, and on the second end side with a second protective layer that is electrically insulating.

Typically, to the cathode part and the anode part, a cathode lead and an anode lead are electrically connected, respectively. The cathode lead can be electrically connected to the cathode part via an electrically conductive adhesive layer.

The solid electrolytic capacitor may include an element stack in which a plurality of (two or more) capacitor elements are stacked together. The capacitor elements are stacked such that, for example, the anode parts overlap each other, while the cathode parts overlap each other. In this case, to an anode overlapping portion where the anode parts overlap each other, an anode lead is connected. To a cathode overlapping portion where the cathode parts overlap each other, a cathode lead is connected.

In the element stack, two or more capacitor elements may each have on the surface of the cathode part, the insulating first protective layer provided on the first end side, and the insulating second protective layer provided on the second end side. Then, the cathode parts of the capacitor elements may be electrically connected to each other via the conductive adhesive layer. Preferably, the cathode parts of all the capacitor elements are each individually covered with the first protective layer and the second protective layer.

In the solid electrolytic capacitor having the first and second protective layers, the cathode part can be covered, without excess or deficiency, by the first and second protective layers. Furthermore, the region between the first protective layer and the second protective layer is comparatively less susceptible to moisture and oxygen. The presence of the first and second protective layers, therefore, can reduce the influence of moisture and oxygen on the capacitor element. Besides, the first and second protective layers do not impede the connection between the cathode part and the cathode lead or between the cathode parts. Thus, low ESR can be easily achieved. Moreover, the structure having the first protective layer at one end and the second protective layer at the other end is excellent in symmetry. This can improve the reliability of the connection between the cathode part and the cathode lead or between the cathode parts.

The capacitor element includes, for example, an anode body in a foil state, a dielectric layer provided on a surface of the anode body, a solid electrolyte layer provided on the second end side so as to cover part of the dielectric layer, and a cathode leading layer covering at least part of the solid electrolyte layer. The anode part is constituted of a region of the anode body, the region not covered with the solid electrolyte layer. The cathode part is constituted of the solid electrolyte layer and the cathode leading layer.

The cathode leading layer covering at least part of the solid electrolyte layer includes, for example, a carbon layer, and an electrically conductive paste layer. The conductive paste layer is typically formed of an electrically conductive paste containing a thermosetting resin component and metal particles dispersed in the resin component. The resin component may be cured by heating the conductive paste. The resin component allows outside air (e.g., moisture, oxygen) to pass therethrough; however, by covering the cathode part with the insulating first and second protective layers, outside air such as moisture and oxygen becomes unlikely to reach the cathode part. This can suppress the deterioration of the cathode part (especially, the solid electrolyte layer) or prevent an increase in ESR of the solid electrolytic capacitor.

The solid electrolyte layer sometimes has an exposed area which is not covered with the cathode leading layer. Since the exposed area of the solid electrolyte layer is especially susceptible to moisture and oxygen entering from outside, the deterioration of the solid electrolyte layer tends to start from the exposed area. Therefore, the first protective layer preferably covers at least part of the exposed area of the solid electrolyte layer. This can further suppress the deterioration of the solid electrolytic capacitor.

The second protective layer preferably covers an end surface of the cathode part disposed on the second end side. In other words, the second protective layer preferably covers both principle surfaces on the second end side of the cathode part included in the capacitor element in a foil state, as well as the end surface at the second end, so that the second protective layers formed on the both principle surfaces continue from one to the other. Preferably, the second protective layer further covers two side surfaces, in addition to the both principle surfaces and the end surface.

The first protective layer and the second protective layer are preferably spaced apart from each other. This can allow an electrically conductive path formed between the first protective layer and the second protective layer, via the conductive adhesive layer with neither protective layer interposed. This is advantageous in reducing the ESR of the solid electrolytic capacitor.

The first protective layer and the second protective layer in combination preferably cover 60% or more of the surface of the cathode part. In this configuration, since the surface of the cathode part is largely covered with the first and second protective layers, the deterioration of the solid electrolytic capacitor due to moisture and oxygen from outside can be further suppressed.

The capacitor element is typically sealed, together with part of the anode lead and part of the cathode lead, by a packaging resin. The packaging resin constitutes a packaging body that covers the solid electrolytic capacitor. Part of the anode lead that functions as an anode external terminal and part of the cathode lead that functions as a cathode external terminal are each extended outside without being covered by the packaging resin. The anode lead and the cathode lead are both metal material and formed of, for example, a material cut out from a metal sheet.

Figure 2:
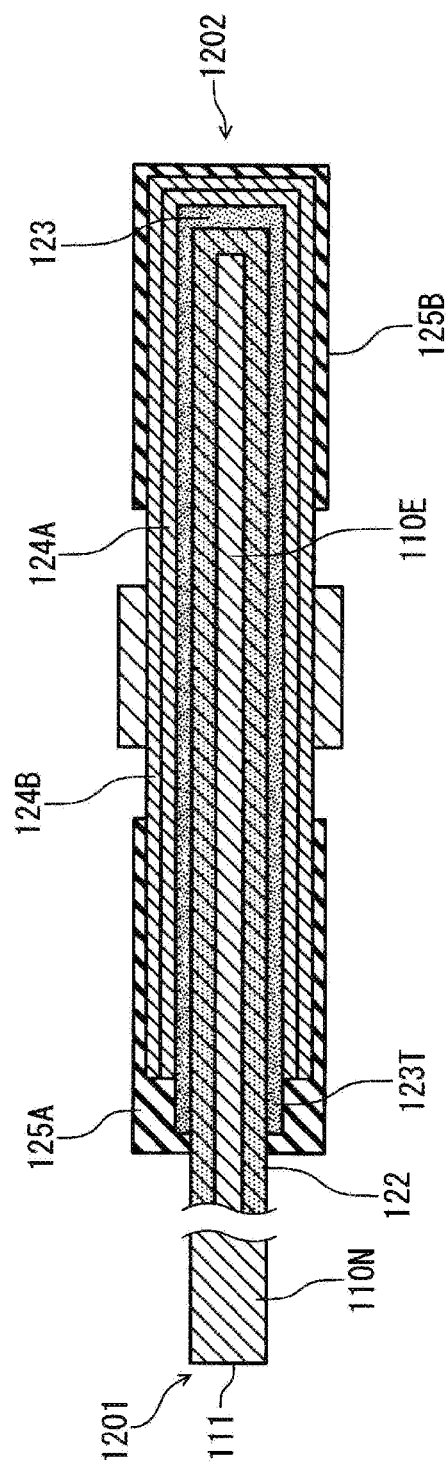
FIG. 2 A schematic cross-sectional view of the capacitor element according to the first embodiment.

FIG. 1 is a cross-sectional view schematically showing a solid electrolytic capacitor 130 including an element stack of capacitor elements 120 (120A to 120C). FIG. 2 is a cross-sectional view schematically showing the structure of the capacitor element 120.

The capacitor elements 120 each include an anode body 111 in a foil state having an anode part 110N and a cathode-forming part 110E. The anode part 110N constitutes a first end 1201 side portion of the capacitor element 120. The cathode-forming part 110E constitutes a second end 1202 side portion of the capacitor element 120. The anode body 111 having the anode part 110N and the cathode-forming part 110E is formed by, for example, partially etching a metal foil.

A dielectric layer 122 is formed on the cathode-forming part 110E. Without limited to the illustrated example, the dielectric layer 122 may be formed all over the anode body 111 including the anode part 110N. The dielectric layer 122 is partially covered with a solid electrolyte layer 123, and the solid electrolyte layer 123 is covered with a cathode leading layer 124 (carbon layer 124A and electrically conductive paste layer 124B). In other words, the anode part 110N is constituted of a region of the anode body 111, the region not covered with the solid electrolyte layer 123. The cathode part is constituted of the solid electrolyte layer 123 and the cathode leading layer 124.

In each of the capacitor elements 120A to 120C, the cathode part is covered with a first protective layer 125A on the first end 1201 side and with a second protective layer 125B on the second end 1202 side. The solid electrolyte layer 123 has, at the closest end from the first end 1201, an exposed area 123T of the solid electrolyte layer 123, the area not covered with the cathode leading layer 124. The exposed area 123T is, however, covered with the first protective layer 125A. Therefore, the deterioration of the solid electrolyte layer 123 starting from the exposed area 123T can be suppressed. Moreover, since a large area of the cathode part (e.g., 60% or more) is covered with a combination of the first and second protective layers 125A and 125B, not only the exposed area 123T but also most part of the cathode part can be blocked from moisture and oxygen entering from outside air.

The surface of the cathode part can be covered with the first protective layer 125A on the first end side and with the second protective layer 125B on the second end side by, for example, applying a solution of an electrically insulating material onto the cathode part, except an area on which an electrically conductive adhesive layer 126 is to be provided, and drying the solution. In this case, as shown in FIG. 2, preferably, the end surface (and the side surfaces) of the cathode part on the second end 1202 is entirely covered with the second protective layer 125B. Thereafter, an electrically conductive adhesive is applied at least between the first protective layer 125A and the second protective layer 125B.

The capacitor elements 120A to 120C are connected in parallel to each other via the conductive adhesive layers 126 interposed between the cathode parts. To an anode overlapping portion where the anode parts 110N overlap each other, an anode lead 132 bent into a predetermined shape is electrically connected. To a cathode overlapping portion, a cathode lead 133 is electrically connected via the conductive adhesive layers 126. Since the first protective layers 125A and the second protective layers 125B are spaced apart from each other, these connections are unlikely to be significantly interrupted by each protective layer.

Next, the element stack is sealed, together with part of the anode lead 132 and part of the cathode lead 133, by a packaging resin 131. The anode lead 132 and the cathode lead 133 are each partially exposed from the packaging resin 131, to function as external terminals.

According to the present invention, since the cathode part is covered with the first and second protective layers provided on both sides of the conductive adhesive layer, the deterioration of the solid electrolytic capacitor can be suppressed.

Second Embodiment

A solid electrolytic capacitor according to the present embodiment includes one or more capacitor elements. The capacitor element has an anode part provided on a first end side, and a cathode part provided on a second end side opposite the first end, so as to be adjacent to the anode part. Typically, to the cathode part and the anode part, a cathode lead and an anode lead are electrically connected, respectively. The cathode lead can be electrically connected to the cathode part via an electrically conductive adhesive layer.

In the structure disclosed in Patent Literature 1, when connecting the cathode parts of the capacitor elements to each other or connecting the cathode parts to the cathode lead, in view of preventing short-circuit, the conductive adhesive is disposed at a position away from the boundary between the anode part and the cathode part. This forms a gap from which the cathode part is exposed, between the insulating resin layer and the conductive adhesive. If there is such a gap, stress will concentrate on a portion near the gap, causing the strength of the capacitor element to decrease. Moreover, when sealing the capacitor element with the packaging resin, the packaging resin cannot enter the gap, tending to form an internal void within the solid electrolytic capacitor. Furthermore, moisture and oxygen will enter through the gap from which the cathode part is exposed, accelerating the deterioration of the cathode layer.

In view of the above, in the present embodiment, the insulating first protective layer is provided on the surface of the cathode part at least on the first end side. The surface of the cathode part on the first end side includes the boundary with the anode part. The boundary between the anode part and the cathode part is susceptible to moisture and oxygen, and the cathode part tends to start to deteriorate from the boundary. By covering the surface of the cathode part on the first end side with the first protective layer, the deterioration of the cathode part can be effectively suppressed. Preferably, the first protective layer covers the boundary between the anode and cathode parts as much as possible. In addition to the first protective layer, the second protective layer may be further provided on the surface of the cathode part on the second end side.

The solid electrolytic capacitor may include an element stack of a plurality of (two or more) capacitor elements. The capacitor elements are stacked such that, for example, the anode parts overlap each other, while the cathode parts overlap each other. In this case, to an anode overlapping portion where the anode parts overlap each other, an anode lead is connected. To a cathode overlapping portion where the cathode parts overlap each other, a cathode lead is connected.

In the element stack, two or more capacitor elements may each have the insulating first protective layer provided on the surface of the cathode part on the first end side. Then, the cathode parts of the capacitor elements may be electrically connected to each other via an electrically conductive adhesive layer. Preferably, the cathode parts of all the capacitor elements are each individually provided with the first protective layer. This can significantly reduce the influence of moisture and oxygen on the boundary between the anode and cathode parts.

Given that the distance from the boundary between the anode and cathode parts (the cathode part on the first end side) to the second end is denoted by L, the first protective layer preferably covers an area of at least 0.5×L from the boundary of the cathode part. In the solid electrolytic capacitor having the first protective layer as above, the influence of moisture and oxygen can be considerably reduced.

The conductive adhesive layer that connects the cathode parts to the cathode lead or connects the cathode parts to each other is disposed so as to cover at least part of the first protective layer provided in the capacitor elements. In this case, preferably, the first protective layer and the conductive adhesive are provided such that no gap is left therebetween. The percentage of the area covered with the first protective layer on the surface of the cathode part is not limited, as long as the electrical connection between the conductive adhesive and the cathode part can be achieved. In view of suppressing the deterioration of the cathode part, preferably, the largest possible percentage of the surface of the cathode part is covered with the first protective layer. On the other hand, in view of reducing the ESR, preferably, the largest possible percentage of the surface of the cathode part is brought into contact with the conductive adhesive layer. Furthermore, in view of preventing internal short-circuit, preferably, an area of 0.25×L of the first protective layer from the boundary between the anode and cathode parts (the cathode part on the first end side) is left uncovered with the conductive adhesive layer.

The capacitor element includes, for example, an anode body in a foil state, a dielectric layer provided on a surface of the anode body, a solid electrolyte layer provided on the second end side so as to cover part of the dielectric layer, and a cathode leading layer covering at least part of the solid electrolyte layer. The anode part is constituted of a region of the anode body, the region not covered with the solid electrolyte layer. The cathode layer is constituted of the solid electrolyte layer and the cathode leading layer.

The cathode leading layer covering at least part of the solid electrolyte layer includes, for example, a carbon layer, and an electrically conductive paste layer. The conductive paste layer is typically formed of an electrically conductive paste containing a thermosetting resin component and metal particles dispersed in the resin component. The resin component may be cured by heating the conductive paste. The resin component allows outside air (e.g., moisture, oxygen) to pass therethrough. By covering the surface of the cathode part on the first end side, which is susceptible to moisture and oxygen, with the insulating first protective layer, it is possible to suppress the deterioration of the cathode part (especially, the solid electrolyte layer) or prevent an increase in ESR of the solid electrolytic capacitor.

The solid electrolyte layer sometimes has an exposed area which is not covered with the cathode leading layer. Since the exposed area of the solid electrolyte layer is especially susceptible to moisture and oxygen entering from outside, the deterioration of the solid electrolyte layer tends to start from the exposed area. Therefore, the first protective layer preferably covers at least part of the exposed area of the solid electrolyte layer. This can further suppress the deterioration of the solid electrolytic capacitor.

The second protective layer may be additionally provided on the surface of the cathode part on the second end side. In this case, the second protective layer preferably covers an end surface of the cathode part on the second end side. In other words, the second protective layer preferably covers both principle surfaces on the second end side of the cathode part included in the capacitor element in a foil state, as well as the end surface at the second end, so that the second protective layers formed on the both principle surfaces continue from one to the other. Preferably, the second protective layer further covers two side surfaces, in addition to the both principle surfaces and the end surface.

When the first and second protective layers are provided on the first and second end sides, respectively, these protective layers are preferably spaced apart from each other. This can allow an electrically conductive path formed between the first and second protective layers, via the conductive adhesive layer with neither protective layer interposed. The ESR of the solid electrolytic capacitor can thus be reduced.

When the second protective layer is not provided, the first protective layer preferably covers 50% or more of the surface of the cathode part. By disposing the first protective layer in this way, the deterioration of the cathode part due to moisture and oxygen from outside can be further suppressed. When the second protective layer is provided, the first protective layer and the second protective layer in combination preferably cover 60% or more of the surface of the cathode part. The conductive adhesive layer is also effective in blocking the permeation of moisture and oxygen from outside. Therefore, a combination of the first protective layer and the conductive adhesive layer may cover 60% or more of the surface of the cathode part. A combination of the first and second protective layers and the conductive adhesive layer may cover 60% or more of the surface of the cathode part.

The capacitor element is typically sealed, together with part of the anode lead and part of the cathode lead, by a packaging resin. The packaging resin constitutes a packaging body that covers the solid electrolytic capacitor. Part of the anode lead that functions as an anode external terminal and part of the cathode lead that functions as a cathode external terminal are each extended outside without being covered by the packaging resin. The anode lead and the cathode lead are both metal material and formed of, for example, a material cut out from a metal sheet.

Figure 3:
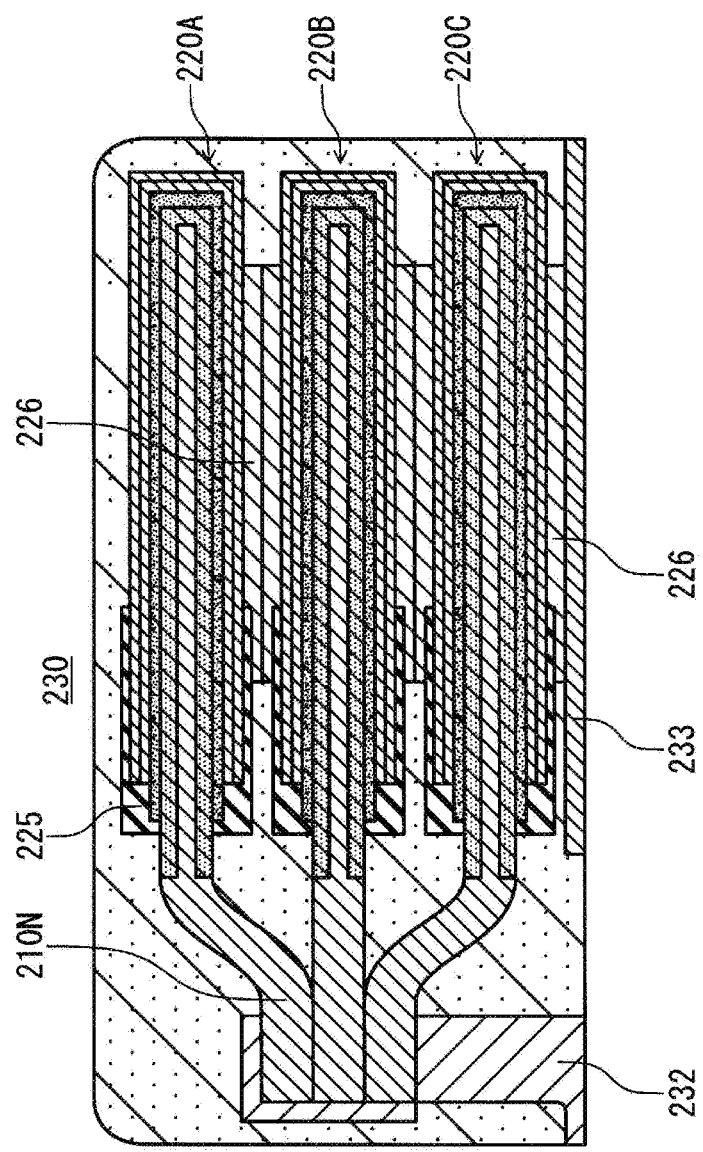
FIG. 3 A vertical cross-sectional view of an example of a solid electrolytic capacitor including a stack of capacitor elements according to a second embodiment.
Figure 4:
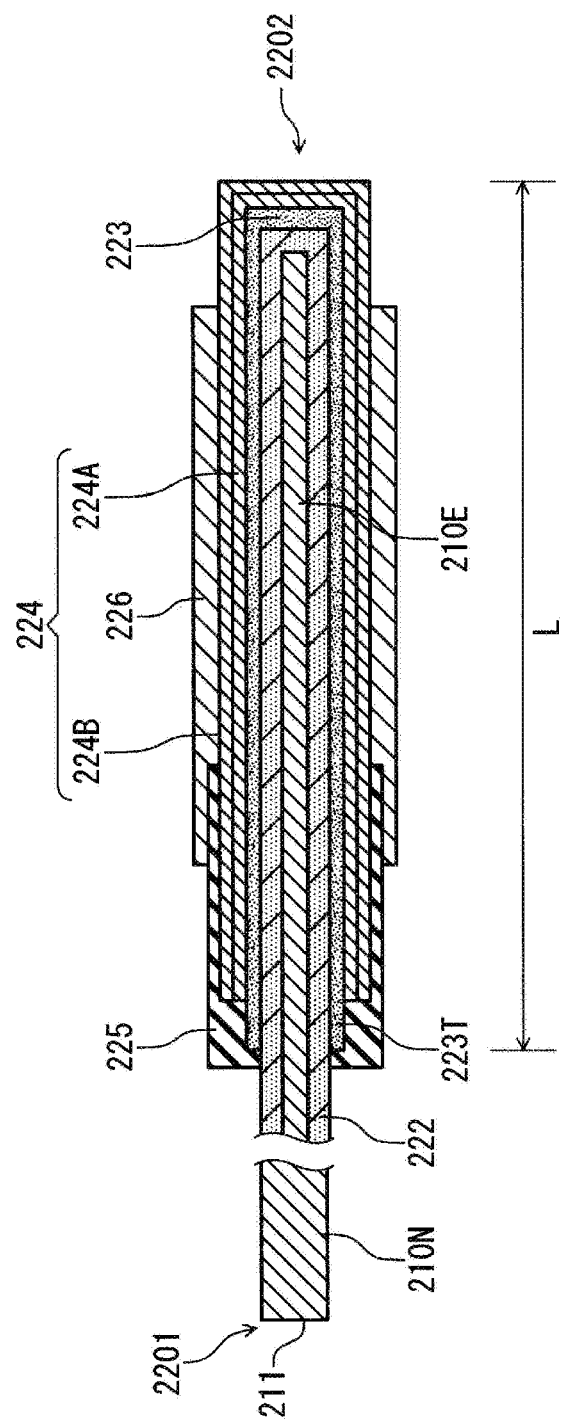
FIG. 4 A schematic cross-sectional view of the capacitor element according to the second embodiment.

FIG. 3 is a cross-sectional view schematically showing a solid electrolytic capacitor 230 including an element stack of capacitor elements 220 (220A to 220C). FIG. 4 is a cross-sectional view schematically showing the structure of the capacitor element 220.

The capacitor elements 220 each include an anode body 211 in a foil state having an anode part 210N and a cathode-forming part 210E. The anode part 210N constitutes a first end 2201 side portion of the capacitor element 220. The cathode-forming part 210E constitutes a second end 2202 side portion of the capacitor element 220. The anode body 211 having the anode part 210N and the cathode-forming part 210E is formed by, for example, partially etching a metal foil.

A dielectric layer 222 is formed on the cathode-forming part 210E. Without limited to the illustrated example, the dielectric layer 222 may be formed all over the anode body 211 including the anode part 210N. The dielectric layer 222 is covered with a solid electrolyte layer 223, and the solid electrolyte layer 223 is covered with a cathode leading layer 224 (carbon layer 224A and electrically conductive paste layer 224B). In other words, the anode part 210N is constituted of a region of the anode body 211, the region not covered with the solid electrolyte layer 223. The cathode part is constituted of the solid electrolyte layer 223 and the cathode leading layer 224.

In each of the capacitor elements 220A to 220C, the cathode part is covered with a protective layer 225 on the first end 2201 side. The solid electrolyte layer 223 has, at the closest end from the first end 2201, an exposed area 223T of the solid electrolyte layer 223, the area not covered with the cathode leading layer 224. The exposed area 223T is, however, covered with the protective layer 225. Therefore, the deterioration of the solid electrolyte layer 223 starting from the exposed area 223T can be suppressed. Moreover, since a large area of the cathode part on the first end side is covered with the protective layer 225, not only the exposed area 223T but also most part of the cathode part on the first end side can be blocked from moisture and oxygen entering from outside.

The surface of the cathode part on the first end side can be covered with the protective layer 225 by, for example, applying a solution of an electrically insulating material onto the cathode part on the first end side, and drying the solution. Thereafter, an electrically conductive adhesive is applied so as to cover at least part of the protective layer 225.

The capacitor elements 220A to 220C are connected in parallel to each other via the conductive adhesive layers 226 interposed between the cathode parts. The conductive adhesive layers 226 are each disposed so as to cover at least part of the protective layer 225 and so as not to leave a gap between the protective layer 225 and the conductive adhesive layer 226. The conductive adhesive layers 226 are each electrically connected to the cathode leading layer 224. To an anode overlapping portion where the anode parts 210N overlap each other, an anode lead 232 bent into a predetermined shape is electrically connected. To a cathode overlapping portion, a cathode lead 233 is electrically connected via the conductive adhesive layers 226.

Next, the element stack is sealed, together with part of the anode lead 232 and part of the cathode lead 233, by a packaging resin 231. The anode lead 232 and the cathode lead 233 are each partially exposed from the packaging resin 231, to function as external terminals.

Figure 5:
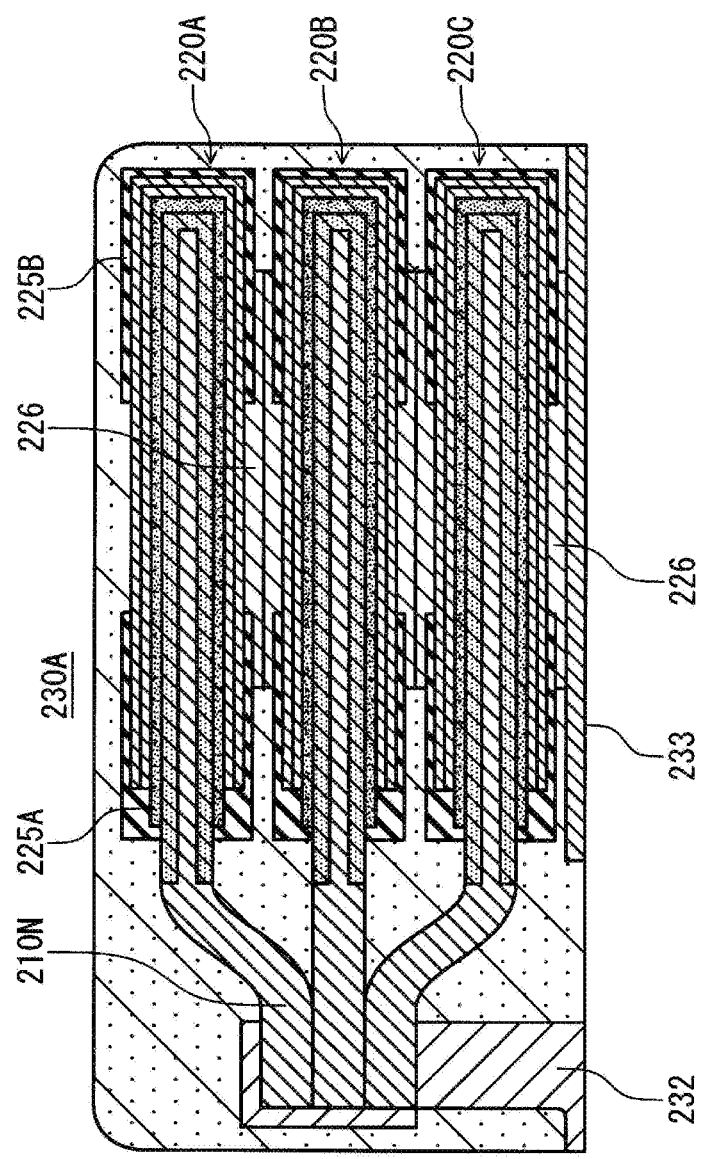
FIG. 5 A vertical cross-sectional view of an example of another solid electrolytic capacitor including a stack of capacitor elements according to the second embodiment.

FIG. 5 is a cross-sectional view schematically showing a solid electrolytic capacitor 230A according to another embodiment including an element stack of the capacitor elements 220 (220A to 220C). In FIG. 5, the components corresponding to those of FIG. 3 are denoted by the same reference numerals. In FIG. 5, in each of the capacitor elements 220A to 220C, the cathode part is covered with a first protective layer 225A on the first end 2201 side and with a second protective layer 225B on the second end 2202 side. In this case, since a large area of the cathode part (e.g., 60% or more) is covered with a combination of the first and second protective layers 225A and 225B, the cathode part can be almost entirely blocked from moisture and oxygen entering from outside.

The surface of the cathode part can be covered with the first protective layer 225A on the first end side and with the second protective layer 225B on the second end side by, for example, applying a solution of an electrically insulating material onto the cathode part, except an area on which the conductive adhesive layer 226 is to be provided, and drying the solution. In this case, as shown in FIG. 5, preferably, the end surface (and the side surfaces) of the cathode part on the second end 2202 side is entirely covered with the second protective layer 225B. Thereafter, an electrically conductive adhesive is applied between the first protective layer 225A and the second protective layer 225B. Since the first protective layer 225A and the second protective layer 225B are spaced apart from each other, the connection between the capacitor elements and the connection between the capacitor elements and the cathode lead are unlikely to be significantly interrupted by the protective layer 225.

According to the present embodiment, since the conductive adhesive is disposed so as to cover at least part of the protective layer, a gap from which the cathode part is exposed is unlikely formed between the protective layer and the conductive adhesive. Furthermore, the deterioration of the cathode layer due to the entry of moisture and oxygen through such a gap can be suppressed. Therefore, a solid electrolytic capacitor excellent in the strength of the capacitor element and the reliability can be obtained.

Next, a description will be made about components of the solid electrolytic capacitor.

(Anode Body)

The anode body forming the anode part is a foil (metal foil) containing a valve metal and having a first principle surface and a second principle surface on the opposite side. Examples of the valve metal include titanium, tantalum, aluminum, and niobium. The thickness of the anode body is, for example, 50 to 250 μm, but not limited thereto.

(Dielectric Layer)

The dielectric layer can be formed by anodizing the anode body surface by, for example, chemical treatment. When aluminum is used as the valve metal, a dielectric layer containing $Al_2O_3$ is formed. The dielectric layer is not limited thereto, and may be in any form as long as it functions as a dielectric.

(Solid Electrolyte Layer)

The solid electrolyte layer preferably contains an electrically conductive polymer. Examples of the conductive polymer include polypyrrole, polythiophene, polyflan, polyaniline, polyacetylene, polyphenylene, polyphenylenevinylene, polyacene, and/or polythiophene vinylene, and derivatives of these materials. The solid electrolyte layer containing the conductive polymer can be formed by, for example, subjecting a raw material monomer to chemical polymerization and/or electrolytic polymerization on the dielectric layer. Alternatively, it can be formed by applying a solution in which the conductive polymer is dissolved or a dispersion in which the conductive polymer is dispersed, onto the dielectric layer.

(Cathode Leading Layer)

The cathode leading layer may have any configuration that has current collecting function. The cathode leading layer has, for example, a carbon layer, and an electrically conductive paste layer formed on the carbon layer. The carbon layer is formed of a composite containing an electrically conductive carbon material. Examples of the conductive carbon material include carbon black, graphite, graphene, and carbon nanotube.

The conductive paste layer can be formed from an electrically conductive paste containing a resin component and metal particles by heating the paste to cure the resin component. Examples of the metal particles include silver particles. Examples of the resin component includes epoxy resin and phenol resin, among which epoxy resin is preferable.

(First Protective Layer and Second Protective Layer)

The first and the second protective layer can be formed from any electrically insulating material that have functions to block moisture and oxygen entering from outside. Examples of the insulating material include polyphenylene sulfone, polyether sulfone, polytetrafluoroethylene, tetrafluoroethylene-perfluoroalkyl vinyl ether copolymer, polyimide, polyamide-imide, and epoxy resin. Among them, polyamide-imide resin is preferable in that it has excellent insulating properties, and it can easily adhere onto the cathode part, thus being capable of forming a dense layer. In addition, polyamide-imide resin can easily form a thin and homogeneous protective layer, which is advantageous in reducing the height of the solid electrolytic capacitor. Furthermore, polyamide-imide resin is particularly effective in blocking moisture and oxygen.

The first and the second protective layer may be formed from the same insulating material or different insulating materials. Preferably, at least one of the first and second protective layers contains polyamide-imide resin.

The first and the second protective layer can be provided by, for example, applying a solution of an electrically insulating material in a solvent, onto the surface of the cathode part on the first end side or on the second end side, and then volatilizing the solvent.

The thickness of the first and the second protective layer is preferably 0.5 μm or more, and more preferably 1 μm or more. To prevent the stack of capacitor elements from being too thick, the thickness of the first and the second protective layer is preferably 5 μm or less.

(Conductive Adhesive Layer)

The conductive adhesive layer can be formed by, for example, applying an electrically conductive adhesive containing a resin component and metal particles onto the cathode part, and curing the resin component. Examples of the metal particles include silver particles. Preferable examples of the resin component include epoxy resin and phenol resin.

(Packaging Resin)

The packaging resin constitutes a package of the solid electrolytic capacitor. The package can be formed by, for example, transfer molding of a resin composition. The resin composition includes a resin component, such as epoxy resin, phenol resin, silicone resin, melamine resin, urea resin, alkyd resin, polyurethane, polyimide, polyamide-imide, or unsaturated polyester.

The package preferably contains a filler. The filler may have any average particle size. The filler may be of any type, and is, for example, silica, or alumina.

INDUSTRIAL APPLICABILITY

The solid electrolytic capacitor according to the present invention is less likely to deteriorate, and is therefore suitable for use, for example, in a high temperature environment over a long term.

REFERENCE SIGNS LIST

110N: Anode part, 110E: Cathode-forming part, 111: Anode body, 120 (120A, 120B, 120C): Capacitor element, 122: Dielectric layer, 123: Solid electrolyte layer, 123T: Exposed area, 124: Cathode leading layer (124A: Carbon layer, 124B: Silver paste layer), 125A: First protective layer, 125B: Second protective layer, 126: Conductive adhesive layer, 130: Solid electrolytic capacitor, 131: Packaging resin, 132: Anode lead, 133: Cathode lead, 1201: First end, 1202: Second end 210N: Anode part, 210E: Cathode-forming part, 211: Anode body, 220 (220A, 220B, 220C): Capacitor element, 222: Dielectric layer, 223: Solid electrolyte layer, 223T: Exposed area, 224: Cathode leading layer (224A: Carbon layer, 225B: Silver paste layer), 225: Protective layer, 226: Conductive adhesive layer, 230 (230A): Solid electrolytic capacitor, 231: Packaging resin, 232: Anode lead, 233: Cathode lead, 2201: First end, 2202: Second end

The invention claimed is:

1. A solid electrolytic capacitor comprising:
a capacitor element including an anode part provided on a first end side, and a cathode part provided on a second end side opposite the first end, so as to be adjacent to the anode part; and
a cathode lead connected to the cathode part, wherein
the capacitor element has, on a surface of the cathode part, a first protective layer and a second protective layer, the first protective layer being electrically insulating and provided on the first end side, the second protective layer being electrically insulating and provided on the second end side,
the cathode part and the cathode lead are connected to each other via an electrically conductive adhesive layer, and
the electrically conductive adhesive layer is provided at least between the first protective layer and the second protective layer.

2. The solid electrolytic capacitor of claim 1, wherein the electrically conductive adhesive layer is disposed so as to cover at least part of the first protective layer.

3. The solid electrolytic capacitor of claim 2, wherein the second protective layer is provided on the second end side, and covers an end surface of the cathode part disposed on the second end side.

4. The solid electrolytic capacitor of claim 2, wherein
the capacitor element includes an anode body in a foil state, a dielectric layer provided on a surface of the anode body, a solid electrolyte layer provided on the second end side so as to cover at least part of the dielectric layer, and a cathode leading layer covering at least part of the solid electrolyte layer,
the anode part is constituted of a region of the anode body, the region not covered with the solid electrolyte layer,
the cathode part is constituted of the solid electrolyte layer and the cathode leading layer,
the solid electrolyte layer has an exposed area not covered with the cathode leading layer, and
the first protective layer covers at least part of the exposed area and at least part of the cathode leading layer.

5. The solid electrolytic capacitor of claim 1, wherein the second protective layer covers an end surface of the cathode part disposed on the second end side.

6. The solid electrolytic capacitor of claim 1, wherein the first protective layer and the second protective layer are spaced apart from each other.

7. The solid electrolytic capacitor of claim 1, wherein the first protective layer and the second protective layer in combination cover 60% or more of the surface of the cathode part.

8. The solid electrolytic capacitor of claim 1, wherein
the capacitor element includes an anode body in a foil state, a dielectric layer provided on a surface of the anode body, a solid electrolyte layer provided on the second end side so as to cover at least part of the dielectric layer, and a cathode leading layer covering at least part of the solid electrolyte layer,
the anode part is constituted of a region of the anode body, the region not covered with the solid electrolyte layer,
the cathode part is constituted of the solid electrolyte layer and the cathode leading layer,
the solid electrolyte layer has an exposed area not covered with the cathode leading layer, and
the first protective layer covers at least part of the exposed area and at least part of the cathode leading layer.

9. The solid electrolytic capacitor of claim 1, wherein the first protective layer and/or the second protective layer contains polyamide-imide resin.

10. A solid electrolytic capacitor comprising:
an element stack of capacitor elements, each including an anode part provided on a first end side, and a cathode part provided on a second end side opposite the first end, so as to be adjacent to the anode part, wherein
the capacitor elements each have, on a surface of the cathode part, a first protective layer and a second protective layer, the first protective layer being electrically insulating and provided on the first end side, the second protective layer being electrically insulating and provided on the second end side,
the cathode parts of the capacitor elements are connected to each other via an electrically conductive adhesive layer, and
the electrically conductive adhesive layer is provided at least between the first protective layer and the second protective layer.

11. The solid electrolytic capacitor of claim 10, wherein the electrically conductive adhesive layer is disposed so as to cover at least part of each of the first protective layers.

12. The solid electrolytic capacitor of claim 11, wherein the second protective layer is provided on the second end side, and covers an end surface of the cathode part disposed on the second end side.

13. The solid electrolytic capacitor of claim 11, wherein
the capacitor element includes an anode body in a foil state, a dielectric layer provided on a surface of the anode body, a solid electrolyte layer provided on the second end side so as to cover at least part of the dielectric layer, and a cathode leading layer covering at least part of the solid electrolyte layer, the anode part is constituted of a region of the anode body, the region not covered with the solid electrolyte layer, the cathode part is constituted of the solid electrolyte layer and the cathode leading layer, the solid electrolyte layer has an exposed area not covered with the cathode leading layer, and the first protective layer covers at least part of the exposed area and at least part of the cathode leading layer.

14. The solid electrolytic capacitor of claim 10, wherein the second protective layer covers an end surface of the cathode part disposed on the second end side.

15. The solid electrolytic capacitor of claim 10, wherein the first protective layer and the second protective layer are spaced apart from each other.

16. The solid electrolytic capacitor of claim 10, wherein the first protective layer and the second protective layer in combination cover 60% or more of the surface of the cathode part.

17. The solid electrolytic capacitor of claim 10, wherein the capacitor element includes an anode body in a foil state, a dielectric layer provided on a surface of the anode body, a solid electrolyte layer provided on the second end side so as to cover at least part of the dielectric layer, and a cathode leading layer covering at least part of the solid electrolyte layer, the anode part is constituted of a region of the anode body, the region not covered with the solid electrolyte layer, the cathode part is constituted of the solid electrolyte layer and the cathode leading layer, the solid electrolyte layer has an exposed area not covered with the cathode leading layer, and the first protective layer covers at least part of the exposed area and at least part of the cathode leading layer.

18. The solid electrolytic capacitor of claim 10, wherein the first protective layer and/or the second protective layer contains polyamide-imide resin.

* * * * *